(12) United States Patent
Nabuurs

(10) Patent No.: US 6,486,684 B2
(45) Date of Patent: Nov. 26, 2002

(54) DEVICE FOR MEASURING THE POSITION OF AN OBJECT THAT CAN BE MOVED FORWARD AND BACKWARD ALONG A FIXED PATH

(75) Inventor: Martinus Wilhelmus Maria Nabuurs, Overloon (NL)

(73) Assignee: Inalfa Industries B.V. (NL)

( * ) Notice: Subject to any disclaimer, the term of this patent is extended or adjusted under 35 U.S.C. 154(b) by 0 days.

(21) Appl. No.: 09/764,186

(22) Filed: Jan. 17, 2001

(65) Prior Publication Data

US 2001/0009375 A1 Jul. 26, 2001

(30) Foreign Application Priority Data

Jan. 20, 2000 (NL) .............................................. 1014131

(51) Int. Cl.⁷ .............................................. G01R 27/08
(52) U.S. Cl. ..................................................... 324/714
(58) Field of Search ................................. 324/714, 715, 324/716, 723

(56) References Cited

U.S. PATENT DOCUMENTS 5,146,173 A * 9/1992 Jurkewitz ................... 324/704

FOREIGN PATENT DOCUMENTS

| DE | 34 01 864 A | 8/1985 |
| DE | 197 56 041 A | 6/1999 |
| FR | 1 454 102 A | 12/1966 |

* cited by examiner

Primary Examiner—N. Le
Assistant Examiner—James Kerveros
(74) Attorney, Agent, or Firm—Westman, Champlin, & Kelly, P.A.; S. Koehler

(57) ABSTRACT

The invention relates to a device for measuring the position of an object that can be moved forward and backward along a fixed path, such as a closure element of an open roof construction for a vehicle. The device includes a driving unit for the object and a pulse generator, which is driven by the driving unit, for delivering pulses during the movement of the object along the path. The device further includes a slow potentiometer, which potentiometer is likewise driven by the driving unit and which is connected to the driving unit via a transmission, such that the potentiometer passes through its range of values maximally once during a complete movement of the object along its fixed path. The slow potentiometer provides a monitoring function with respect to the position signal that is based on the number of registered pulses.

23 Claims, 1 Drawing Sheet

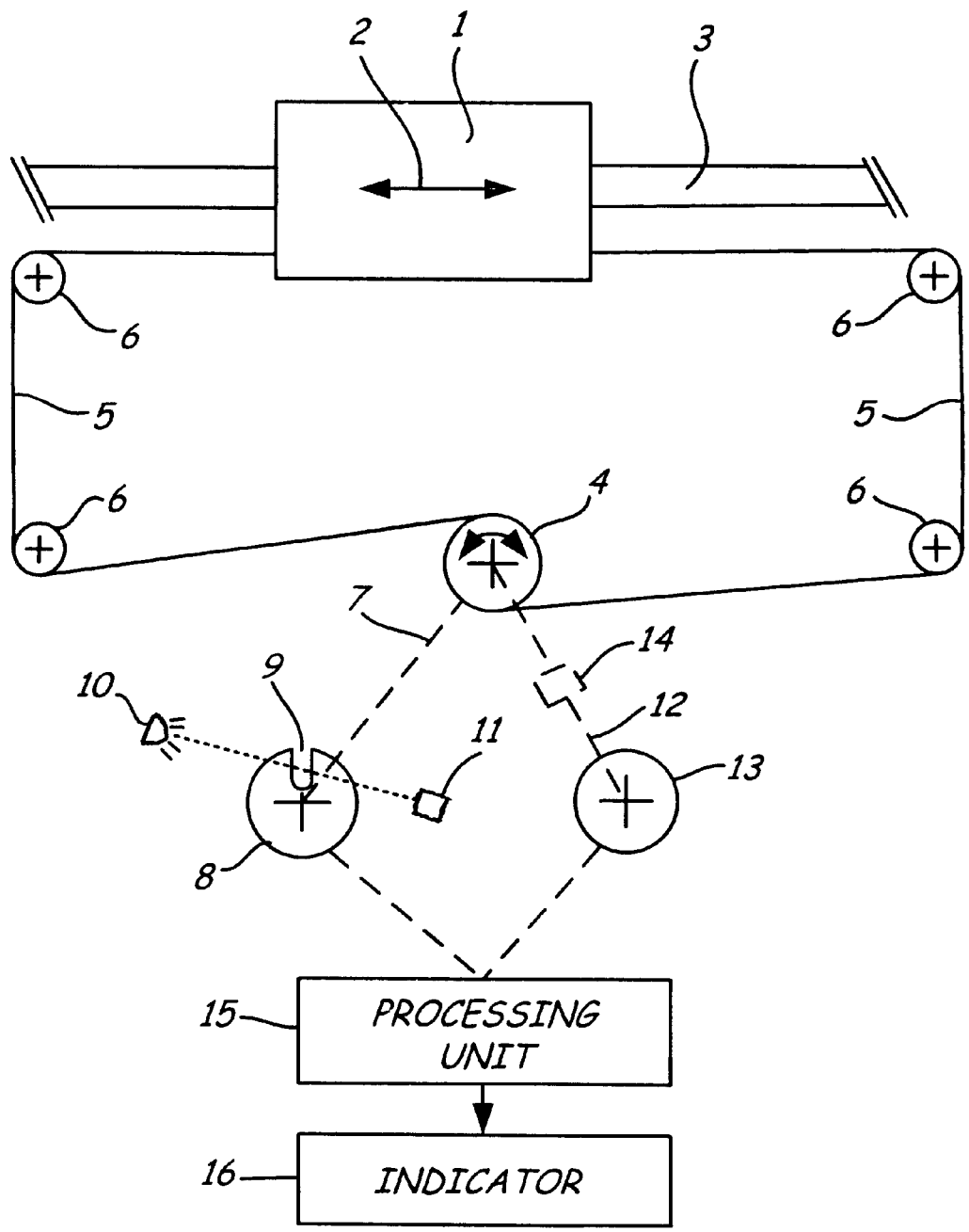

DEVICE FOR MEASURING THE POSITION OF AN OBJECT THAT CAN BE MOVED FORWARD AND BACKWARD ALONG A FIXED PATH

BACKGROUND OF THE INVENTION

The invention relates to a device for measuring the position of an object that can be moved forward and backward along a fixed path, such as a closure element of an open roof construction for a vehicle. The device includes a driving unit for said object and a pulse generator, which is driven by said driving unit. The pulse generator delivers pulses during the movement of the object along said path.

In the case of an object that can be moved forward and backward along a fixed path it is often desirable to know the position of the object along said fixed path. In the above example of a closure element of an open roof construction for a vehicle, the measured position of the closure element can be communicated to the user, so that the latter is informed of the current position of the closure element. The number of pulses delivered during the movement of the object is counted by a suitable processing unit and converted into a position indication that can be recognized by the user.

With prior art devices for measuring the position of an object of the present type that can be moved forward and backward along a fixed path there is a risk of an incorrect number of pulses being delivered. The number of pulses in question may either be too large or too small. The related problems can again be explained by means of the above example. When a closure element of an open roof construction is moved from the closed position to the fully open position by the user, the intention is to obtain, by measuring the position of the closure element, an indication when the closure element has reached a specific position, such as the fully open position in this case. When the pulse generator has delivered too few pulses during the movement of the closure element, the user is incorrectly informed as to the current position of the closure element. While the closure element has already reached the fully open position, the user will think, on the basis of the information that he has received, that the closure element is not fully open yet. Consequently the user will excite the driving unit for the closure element to move the closure element further in the opening direction, while such a movement is no longer possible. This may cause an overload of the driving unit (for example an electric motor in the aforesaid example).

Comparable problems will arise in the case that too many pulses are delivered by the pulse generator.

Apart from that, it is noted that it is not necessarily the pulse generator that causes the problem of too many or too few pulses being delivered. For instance, failures in electronic components and the like can lead to an incorrect number of pulses, as a result of which the distance over which the object has been moved along the fixed path is no longer in correct agreement with the corresponding number of pulses.

SUMMARY OF THE INVENTION

In view of the problem indicated in the foregoing it is an object of the present invention to provide a device for measuring the position of an object that can be moved forward and backward along a fixed path, by means of which the position measurement in question can be monitored.

In one embodiment, the device includes a slow potentiometer or similar device, which potentiometer is likewise driven by the driving unit and which is connected to the driving unit via a transmission, such that the potentiometer passes through its range of values (e.g. resistance) maximally once during a complete movement of the object along its fixed path.

During movement of the object along the fixed path, a determination of the position thereof takes place, which is based both on the number of pulses delivered by the pulse generator and on the signal from the slow potentiometer. When the measured number of pulses deviates too much from the theoretically correct number of pulses, a discrepancy will occur between the position signal based on the number of pulses and the position signal based on the slow potentiometer. In such a case, an error signal or the like can be delivered. In the aforesaid example, the user can, for example, be informed that the system must be reset.

The term "slow potentiometer" is used to express that this potentiometer passes through its range of values maximally once during the complete movement of the object along its fixed path. Commonly, this means that the potentiometer is turned through 360° at most. In this way there is an unequivocal relationship between the signal delivered by the potentiometer (e.g. voltage) and the position of the object along said path. The determination of the position of the object along the path on the basis of the slow potentiometer is less accurate than on the basis of the number of pulses delivered by the pulse generator, of course, but this does not constitute a problem, since the signal delivered by the slow potentiometer is only used for signalling a deviation that exceeds a specific limit (in the present case this means that the number of pulses being delivered is a predetermined number of pulses higher or lower than the theoretically correct number of pulses) As long as no such signalling takes place, the number of pulses delivered by the pulse generator forms the basis for an accurate measurement of the position of the object.

Within the scope of the invention there are several possibilities for realising various embodiments thereof. According to one variant, for example, the pulse generator comprises a quick potentiometer that does not have limit stops, which potentiometer passes through its range of resistance a large number of times during a complete movement of the object along its fixed path. In this case the potentiometer is called a quick potentiometer, in contrast to the aforesaid slow potentiometer, since it passes through its range of resistance several times rather than only once during a complete movement of the object along its fixed path. This directly implies that the quick potentiometer commonly does not have limit stops, that is, it should be capable of multiple or even unlimited rotation without reaching a limit stop during the complete movement of the object. In one embodiment, each complete revolution of the quick potentiometer corresponds to one pulse. Within each pulse a variation of the signal (e.g. voltage) delivered by the quick potentiometer takes place, so that a highly accurate position measurement is possible on the basis of the signal from the quick potentiometer.

In another embodiment, the pulse generator is a digital pulse generator, such as a slotted disc that is rotated by the driving unit, which disc cooperates with a photocell arrangement. During each rotation of the disc a number of pulses (generally in block form or a square wave) corresponding to the number of slots is delivered. With such an embodiment, there is no variable signal within one pulse, so that the position measurement only takes place on the basis of the number of pulses rather than on the basis of the position of a respective pulse, as is the case with the preceding embodiment Finally, an advantageous embodiment of the device according to the invention is one wherein the slow potentiometer does not have limit stops. The advantage that is thus achieved is that it is not necessary for the slow potentiometer to move from its minimum value (e.g. resistance value) position (minimum voltage) to its maximum value position (maximum voltage), or vice versa, during a movement of the object from one end position to the other end position. During said movement of the object, it is now also possible for the slow potentiometer to move from a specific position having a specific value to its maximum value position, then reach the position wherein the value drops to a value such as zero and subsequently moves to substantially the position having the initial value. Also in this case the potentiometer passes through its range of values maximally once, but a zero passage or drop is included. Also here there is an unequivocal connection between the signal delivered by the slow potentiometer and the position of the object.

The use of a slow potentiometer not having limit stops provides benefits during mounting operations, since it is not necessary to mount the slow potentiometer in a specific starting position.

BRIEF DESCRIPTION OF THE DRAWING

The only FIGURE is a schematic illustration of an object movable in the fixed path and a device for measuring the position of the object.

DETAILED DESCRIPTION OF THE ILLUSTRATIVE EMBODIMENT

An embodiment of the device according to the invention is schematically illustrated in the only FIGURE. An object 1, such as for example a closure element of an open roof construction for a vehicle, can be moved forward and backward (indicated by arrow 2) along a fixed path, such as for example guide 3. A driving unit 4 is connected with the object 1 through driving means, such as cables 5 or alike extending around rollers 6. Further, the driving unit 4 (e.g. an electric motor) is drivingly connected (illustrated by dashed line 7) with a pulse generator 8 comprising a quick potentiometer providing an analog or digital signal. The potentiometers herein described can comprise many known devices including those operating with variable resistance, capacitance, etc. In the illustrated embodiment, the pulse generator 8 is a digital pulse generator comprising a disc with slot illustrated by dashed line 9 cooperating with a photocell arrangement 10, 11.

The driving unit 4 further drives (illustrated by dashed line 12) a slow potentiometer 13. The driving connection 12 can be provided with a transmission 14, such that the slow potentiometer 13 passes through its range of values (e.g. resistance) maximally once during a complete movement of the object 1 along its fixed path (herein guide 3).

In a further embodiment, the slow potentiometer 13 does not have limit stops. In this manner, the slow potentiometer 13 will have a first value corresponding to one end of the fixed path and a second value corresponding to the other end of the fixed path. However, during movement of the object along the path, an intermediate value will be obtained that is less than each of the first and second values. For instance, in an embodiment where the slow potentiometer 13 has a range of resistance values, an increase in resistance is obtained from the slow potentiometer from one end of the fixed path as the object moves until a maximum resistance is reached between the ends. Further movement of the object causes a rapid drop in the resistance value to a value such as zero at an intermediate position. The resistance value of the slow potentiometer will then increase again as the object continues to move to the other end. Thus, the intermediate position has a resistance value less than a value at each end of the fixed path. Although there is a discontinuity in resistance values proximate the intermediate position, there nevertheless is a one for one relationship between object position and the value obtained from the slow potentiometer 13.

The signals of the quick potentiometer 8 and of the slow potentiometer 13 are processed by a processing unit 15, which provides a position indication 16 of the object.

As already noted before, open roof constructions comprising a closure element that is capable of forward and backward movement constitute an important field of application for devices to which the invention relates. However, the invention is not limited to such applications. Various modifications are possible within the scope of the invention as defined by the claims.

What is claimed:

1. A device for measuring the position of an object that can be moved forward and backward along a fixed path, the device comprising a driving unit operably coupled to said object, a pulse generator, which is driven by said driving unit, the pulse generator provides pulses during the movement of the object along said path, and a slow potentiometer, which slow potentiometer is driven by the driving unit and which is connected to the driving unit via a transmission, such that the slow potentiometer passes through its range of values maximally once during a complete movement of the object along its fixed path.

2. The device according to claim 1, wherein the pulse generator comprises a quick potentiometer that does not have limit stops, which quick potentiometer passes through its range of values a number of times during a complete movement of the object along its fixed path.

3. The device according to claim 2 wherein the quick potentiometer comprises a range of resistance values.

4. The device according to claim 1, wherein said pulse generator is a digital pulse generator.

5. The device according to claim 4, wherein said digital pulse generator comprises a slotted disc that is rotated by the driving unit, which cooperates with a photocell arrangement.

6. The device according to claim 1, wherein said slow potentiometer does not have limit stops.

7. The device according to claim 1 wherein the slow potentiometer comprises a range of resistance values.

8. The device according to claim 1 and further comprising a processing unit receiving signals from the pulse generator and the slow potentiometer and providing a signal indicative of the position of the object along a fixed path.

9. The device according to claim 8, wherein the pulse generator comprises a quick potentiometer that does not have limit stops, which quick potentiometer passes through its range of values a number of times during a complete movement of the object along its fixed path.

10. The device according to claim 9 wherein the quick potentiometer comprises a range of resistance values.

11. The device according to claim 10, wherein said digital pulse generator comprises a slotted disc that is rotated by the driving unit, which cooperates with a photocell arrangement.

12. The device according to claim 8, wherein said pulse generator is a digital pulse generator.

13. The device according to claim 8, wherein said slow potentiometer does not have limit stops.

14. The device according to claim 8, wherein the slow potentiometer comprises a range of resistance values.

15. A device for measuring the position of an object that can be moved forward and backward along a fixed path, the device comprising:

a driving unit operably couplable to the object;

a pulse generator coupled to the driving unit and providing a signal comprising a plurality of pulses for movement of the object along the path; and measuring means coupled to the driving unit for providing a signal ranging from a first value to a second value only once for complete movement of the object along the path.

16. The device of claim 15 wherein the measuring means passes through a value which is less than the first value and the second value during complete movement of the object along the path.

17. The device of claim 15 wherein the measuring means comprises a potentiometer.

18. The device of claim 17 wherein the potentiometer comprises a range of resistance values.

19. The device of claim 15 wherein the pulse generator provides an analog output signal.

20. The device of claim 19 wherein the pulse generator comprises a potentiometer.

21. The device of claim 20 wherein the potentiometer comprises a range of resistance values.

22. The device of claim 15 wherein the pulse generator provides a digital output signal.

23. The device of claim 22 wherein the pulse generator comprises a photocell.

* * * * *